United States Patent
Kuball et al.

(10) Patent No.: US 6,786,637 B2
(45) Date of Patent: Sep. 7, 2004

(54) TEMPERATURE MEASUREMENT OF AN ELECTRONIC DEVICE

(75) Inventors: Martin Hermann Hans Kuball, Bristol (GB); Jonathan Michael Hayes, Bristol (GB)

(73) Assignee: The University of Bristol, Bristol (GB)

( * ) Notice: Subject to any disclaimer, the term of this patent is extended or adjusted under 35 U.S.C. 154(b) by 0 days.

(21) Appl. No.: 10/242,430

(22) Filed: Sep. 13, 2002

(65) Prior Publication Data

US 2004/0052296 A1 Mar. 18, 2004

(51) Int. Cl.$^7$ .............. G01K 11/00; G01J 5/00
(52) U.S. Cl. .............. 374/161; 374/120; 374/130; 374/121
(58) Field of Search .............. 374/130, 112, 374/117, 120, 121, 129, 161, 159; 702/134; 356/329; 250/227, 342

(56) References Cited

U.S. PATENT DOCUMENTS

| | | | | |
|---|---|---|---|---|
| 4,242,905 A | * | 1/1981 | Challis | 374/45 |
| 4,579,463 A | * | 4/1986 | Rosencwaig et al. | 374/57 |
| 4,682,897 A | * | 7/1987 | Saito et al. | 374/45 |
| 4,890,245 A | * | 12/1989 | Yomoto et al. | 374/121 |
| 5,228,776 A | * | 7/1993 | Smith et al. | 374/5 |
| 5,510,894 A | * | 4/1996 | Batchelder et al. | 356/301 |
| 5,713,666 A | * | 2/1998 | Seelin et al. | 374/121 |
| 5,755,512 A | * | 5/1998 | White | 374/161 |
| 6,054,868 A | * | 4/2000 | Borden et al. | 356/447 |
| 6,116,779 A | * | 9/2000 | Johnson et al. | 374/161 |
| 6,142,663 A | * | 11/2000 | Takasuka | 374/121 |
| 6,146,014 A | * | 11/2000 | Bruce et al. | 374/161 |
| 6,151,119 A | * | 11/2000 | Campion et al. | 356/432 |
| 2002/0126732 A1 | * | 9/2002 | Shakouri et al. | 374/130 |
| 2003/0161380 A1 | * | 8/2003 | Hauenstein | 374/121 |
| 2003/0165178 A1 | * | 9/2003 | Borden et al. | 374/5 |

FOREIGN PATENT DOCUMENTS

| | | | | |
|---|---|---|---|---|
| FR | 2772124 A1 | * | 6/1999 | G01K/11/00 |
| JP | 59081520 A | * | 5/1984 | 356/329 |
| JP | 11337420 A | * | 12/1999 | G01J/3/44 |
| JP | 2001085489 A | * | 3/2001 | H01L/21/66 |

OTHER PUBLICATIONS

NIST, "Raman Spectroscopy", Mar. 2002, http://physics.nist.gov/Divisions/Div844/facilities/raman/Ramanhome.html.*

DeGraff et al., "An Inexpensive Laser Raman Spectrometer Based on CCD Detection", Chem. Educator, vol. 7, No. 1, pp. 15–18, Feb. 2002.*

Agilent Tchnologies, "A Compact Spectrograph for Raman Spectroscopy", May 20, 1998, http://www.semiconductor.agilent.com/spg/doc/diffract/htmlfiles/raman.shtml.*

* cited by examiner

*Primary Examiner*—Diego Gutierrez
*Assistant Examiner*—Mirellys Jagan
(74) *Attorney, Agent, or Firm*—Baker Botts L.L.P.

(57) ABSTRACT

The temperature of an electronic device at specified locations is determined by measuring the phonon frequency shift at the location of interest caused by operation of the device.

15 Claims, 7 Drawing Sheets

TEMPERATURE MEASUREMENT OF AN ELECTRONIC DEVICE

FIELD OF THE INVENTION

The present invention relates to methods of measuring the temperature of an electronic device. It is to be understood that the use of the term electronic is intended to encompass electronic, optoelectronic and photonic devices, semiconductor based or otherwise.

BACKGROUND TO THE INVENTION

It is well known that the temperature of an active electronic or opto-electronic device has an effect on the device performance and reliability. At a basic level, this understanding has resulted in the widespread use of heat sinks to which the active devices are attached, the heat sinks including materials having good thermal conductivity and being designed to efficiently conduct heat away from the active device. Cooling fans and increased ventilation, as well as liquid coolants, have also been used to manage the temperature of active electronic devices.

However, it is becoming increasingly important to gain an understanding of the temperature variations actually within an active device to facilitate a greater understanding of how local areas of increased temperature can effect the device performance and to determine where within the active device such temperature build ups are likely to occur. This is becoming increasingly important as active device dimensions decrease, with the importance of thermal heating effects increasing in proportion to the decreasing device dimensions.

The most commonly used traditional method for non-invasive temperature measurement in active electronic devices is infra-red thermography, also known as infra-red thermal imaging. This technique has been used since the early 1960s and relies on the detection of the infra-red radiation emitted by a hot body. To make the thermal image measurement the entire chip containing the device to be measured must first be heated by contact with a temperature controlled heat sink to a temperature of typically 60–70° C. The resulting infra-red emission from the device is then mapped and this measurement forms a calibration that is subsequently used to avoid interference from the background ambient temperature and to address local variations in surface emissivity. Depositing a layer, such as black paint on the device surface is sometimes used to eliminate surface emissivity variations. The device is then electrically operated and the thermal emission mapped again. The disadvantages of infra-red thermography include limited spatial resolution, dictated by the infra-red wavelength of approximately 3–12 $\mu$m. This gives insufficient resolution for the most recently developed electronic devices having features of this size or smaller. In addition, the materials used to form some electronic devices have low surface temperature emissivity that can cause problems for accurate temperature mapping.

A more accurate alternative to infra-red thermography is the use of Raman scattering. This involves irradiating a target using a laser beam and measuring the light scattered from the target. At any given temperature there will be lattice vibrations within the crystalline structure of a semiconductor device. The laser light irradiated onto the device is inelastically scattered by the lattice vibrations. Inelastic scattering occurs when some energy is transferred during the scattering process. During Raman scattering either a phonon is created (Stokes-Raman scattering) or a phonon is annihilated (Anti-Stokes-Raman scattering). A phonon is the smallest energy quantum of the lattice vibrations. Therefore, because the laser light is inelastically scattered, the scattered light detected, by a spectrometer, has undergone a shift in energy equal to the phonon energy i.e. the frequency of the detected raman scattered laser light is equal to the frequency of the incident laser light plus or minus the frequency of a phonon. The frequency of the phonons varies as a characteristic of different materials, and more importantly varies for any given material as a function of temperature. Hence by detecting the frequency shift of scattered light from an electronic device it is possible to calculate the temperature of the device at the point of irradiation. Advantages of Raman scattering include the fact that no calibration on the measured device is necessary as each semiconductor material used in a device has its own characteristic temperature dependence of phonon frequency.

A further refinement of this technique is to use an optical microscope to focus the laser beam onto the sample and to collect the scattered laser light at a spectrometer. This is known as micro-Raman scattering. The spatial resolution achievable using micro-Raman scattering is directly dependent upon the size of the focused laser beam used to irradiate a sample and can thus be of the order of 1 $\mu$m or better. This is directly comparable to the feature size of currently used semiconductor devices. Examples of methods and systems for measuring semiconductor device temperature using Raman scattering include French patent application FR 2772124 A and Japanese patent applications JP 11-337420 and JP 2001-085489.

However, the present applicants have identified a problem in using micro-Raman scattering associated with the ever decreasing device dimensions of the current and future electronic devices. As the individual features of current devices decrease in dimensions, examples of such features being individual metal contacts, the likelihood and necessity to measure the temperature of the device in close proximity to such a feature is increasing. It has been found that when a device is irradiated using a laser for micro-Raman scattering measurements in close proximity to a metal contact large shifts in phonon frequency are detected that are artefacts in the measurement process as opposed to being due to an intrinsic property of the material under test. The presence of such large frequency shifts due solely to the close proximity of the metal contacts renders its problematic to accurately determine the temperature of the device at that particular point using conventional micro-Raman measurement techniques.

SUMMARY OF THE INVENTION

According to a first aspect of the present invention there is provided a method of measuring the temperature of an electronic device utilising a spectrometer having a slit through which scattered laser light is collected, the method including minimising the width of the spectrometer slit, irradiating an arbitrary location on an electronic device with a laser with the device being inactive, determining the phonon frequency of the device at the arbitrary location using the spectrometer and storing the determined phonon frequency, irradiating a target location on a device with the laser with the device being active and determining the further phonon frequency of the device at the target location with the spectrometer, determining the difference between the stored phonon frequency and further phonon frequency, and determining the temperature of the active device at the target location as a function of the determined phonon frequency difference.

Preferably a plurality of target locations are irradiated with the electronic device being active and the difference determined between the stored phonon frequency and the phonon frequency at each of the plurality of target locations.

According to a second aspect of the present invention there is provided a method of determining the temperature of an electronic device by means of a laser spectrometer, the method comprising minimising the slit width of the spectrometer, measuring the temperature by Raman scattering at a first location on the device with the device inactive at a known ambient temperature, measuring the temperature by Raman scattering at a second location with the device active and summing the difference between said temperatures with the known ambient temperature.

According to a third aspect of the present invention there is provided a method of measuring the temperature of an electronic device, the method comprising irradiating a target location on the device using a laser with the device being inactive and determining a first phonon frequency of the device at the target location, irradiating the target location using the laser with the device being active and determining a second phonon frequency at the target location, determining the difference between the first and second phonon frequency, and determining the temperature of the active device at the target location as a function of the determined phonon frequency difference.

According to a further aspect of the present invention there is provided a method of determining the temperature of an electronic device, the method comprising measuring a first temperature of the device using Raman scattering at a target location with the device inactive, measuring a second temperature of the device using Raman scattering at the target location with the device active and summing the difference between the first and second temperatures to a known ambient temperature.

In the above methods, the electronic device preferably comprises a plurality of portions, each portion having a predetermined bandgap.

Preferably, the wavelength of the laser is selected such that it is less than the bandgap of at least one of the portions.

The laser may be focused on a selected portion using confocal microscopy or alternatively the determined phonon frequency of a selected portion is determined from within an expected frequency range, the expected frequency range being dependent on the material of the selected portion.

Preferably, the spectrometer comprises a charge coupled device and the binning width of the spectrometer is reduced so as to minimise a loss in spatial resolution.

The target location may be in sufficiently close proximity to a metal contact on the electronic device such that some of the laser irradiation is incident on the metal contact.

Additionally, the target position may be selected by detecting areas on the electronic device of comparatively high temperature by measuring infra-red radiation emitted by the device.

According to a further aspect of the present invention there is provided a method of measuring the stress within an electronic device at a target location on the device using a spectrometer having a slit through which scattered laser light is collected, the method including minimising the width of the spectrometer slit, irradiating an arbitrary unstressed location on the device with a laser, determining the phonon frequency of the device at said arbitrary location using the spectrometer and storing the determined phonon frequency, irradiating a target location on the device with the laser and determining the phonon frequency at the target location using the spectrometer, and determining an indication of the electronic device stress at the target location as a function of the difference in phonon frequency between the stored phonon frequency and the phonon frequency at the target location.

BRIEF SUMMARY OF THE DRAWINGS

Embodiments of the present invention will now be described, by way of example only, with reference to the accompanying drawings, of which.

DESCRIPTION OF EMBODIMENTS OF THE INVENTION

The following description is given by way on non-limiting example and as such relates to the temperature measurement of an integrated semiconductor device. However, it will be appreciated by those skilled in the art that the invention is equally applicable to other electronic devices, such as polymer based electronic or opto-electronic devices or organic based devices.

Figure 1:
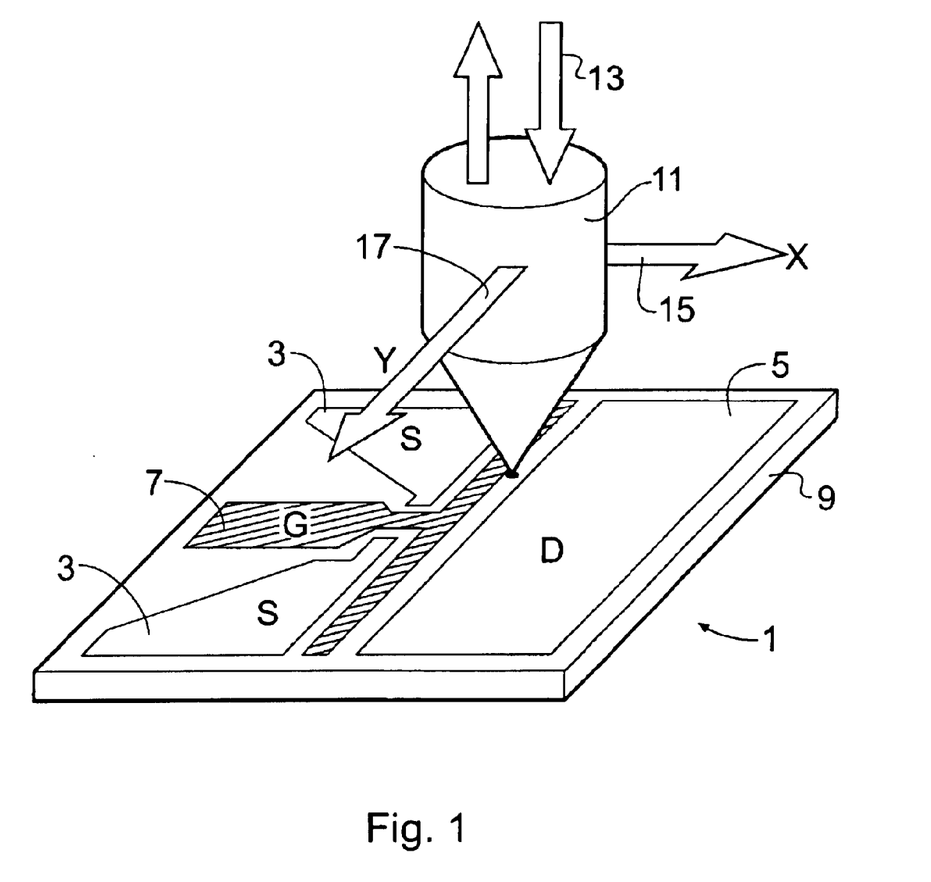
FIG. 1 is a schematic illustration of a focused laser beam irradiating a semiconductor device.

FIG. 1 schematically illustrates the basic arrangement of focused laser beam and semiconductor device used for determining the temperature of a semiconductor device using micro-Raman scattering. The semiconductor device 1 illustrated is a Heterostructure Field Effect Transistor (HFET) having metal contacts for the source 3, drain 5, and gate 7, the contacts having been deposited on a semiconductor heterostructure grown on a substrate 9. A laser focussing element 11 focuses laser light 13 to a small spot size, typically less than 1 $\mu$m in diameter, onto the semiconductor device 1. The location at which the laser is focused on the semiconductor device 1 is the location at which it is designed to measure the temperature of the semiconductor device. Laser light scattered from the semiconductor device 1 is also collected by the focusing element 11 and returned to a spectrometer (not shown). The arrows 15, 17 denote the X and Y directions respectively in which the laser focussing element 11 may translate with respect to the semiconductor device 1. The relative movement may be accomplished by either moving the focusing element 11 itself or by moving the semiconductor device 1.

Figure 2:
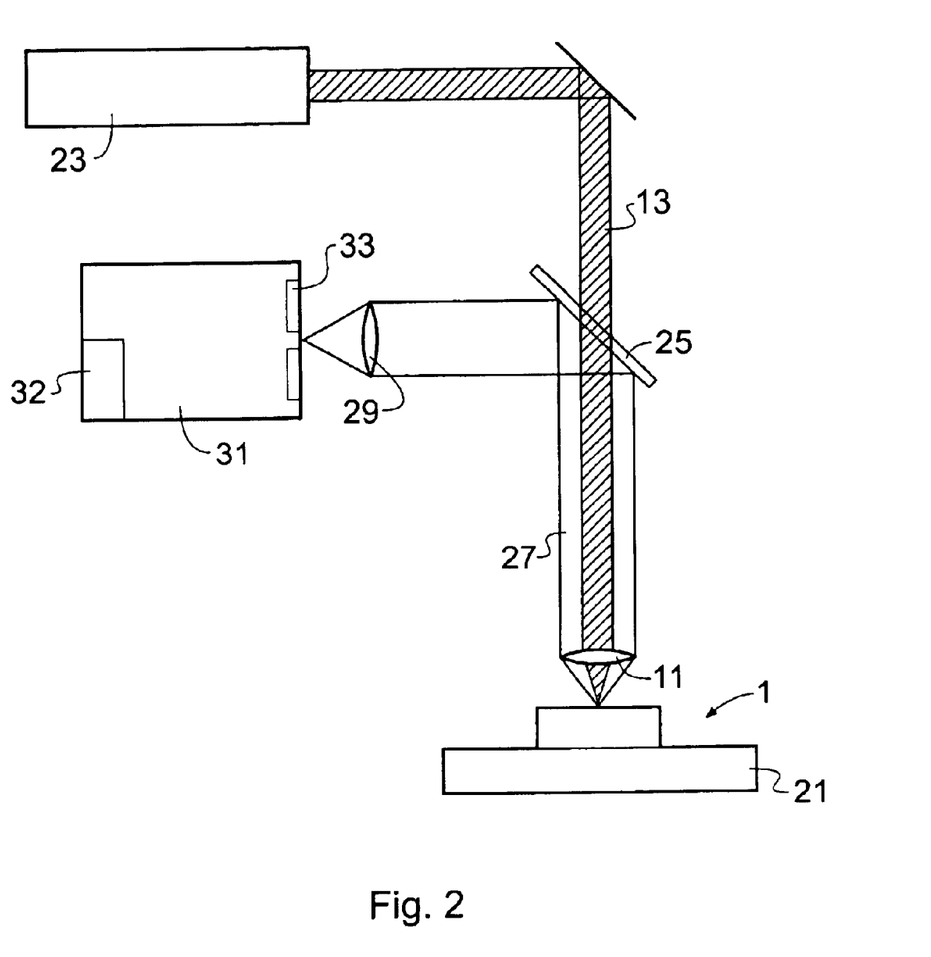
FIG. 2 is a schematic illustration of a laser spectrometer used in accordance with embodiments of the present invention.

FIG. 2 further illustrates an arrangement of a laser spectrometer and semiconductor device used in an embodiment of the present invention. The spectrometer and associated equipment may be of the kind currently commercially available from manufacturers such as Renishaw Plc or Horiba. The semiconductor device 1 to be investigated is mounted on an X/Y translation stage 21 which provides the means for moving the semiconductor device 1 in either the X or Y directions, as indicated in FIG. 1, in increments of typically 1/10 of a μm. Such fine resolution of movement can be achieved by using piezo electric or stepping motor drive devices. An incident laser beam 13 is focused onto the semiconductor sample 1 using an optical lens 11, typically a microscope lens arrangement. The laser beam 13 is generated by a laser 23, that can be an argon laser beam having a wavelength of 514 nm. However, other lasers of differing wavelength may also be used. The laser beam 13 is directed onto the lens 11 through a beam splitter 25. In an alternative arrangement an edge or notch filter may be used in place of the beam splitter 25. The laser light 27 scattered by the semiconductor 1 is directed towards the beam splitter 25 using the lens 11. The beam splitter 25 is positioned such that the scattered laser light 27 is reflected onto a further focusing element 29 that focuses the scattered laser light 27 onto a charge coupled device (CCD) 32 associated with the spectrometer 31. Typically the spectrometer 31 may be a triple grating spectrometer operated in the high-dispersion (additive) mode so as to provide an energy resolution of typically 1 $cm^{-1}$ or better, although single or double grating spectrometers may equally be used. The scattered laser light 27 is passed through a spectrometer slit 33. The spectrometer slit 33 is of variable width, as will be discussed further hereinafter.

It will be appreciated by those skilled in the art that the scattered laser light 27 will have undergone Raman scattering in which the energy of scattered photons will have changed due to the interaction with the lattice vibrations of the semiconductor 1. The incident photons will cause a phonon within the semiconductor lattice to be either annihilated or created and thus the frequency of the scattered photons will have either increased or decreased by the phonon frequency. The spectrometer is arranged to detect the photon frequency of the scattered light 27 and to therefore determine the phonon frequency at the target position of the semiconductor device 1. The temperature at the target position of the semiconductor device 1 can be directly determined as a function of the determined phonon frequency. For any given semiconductor material, the frequency of the phonons either created or destroyed has a particular value. Therefore, a peak in intensity of scattered light at this particular frequency is determined by the spectrometer.

A relationship between phonon frequency and temperature is given by the equation.

$$\omega(T) = \omega_o - \frac{A}{e^{B(hc\omega_o/kT)} - 1}$$

Where ω(T)=phonon frequency at temperature T.
ω$_o$=material dependent characteristic phonon frequency.
h=Planck's constant.
c=speed of light.
k=Boltzrnann's constant.
T=Temperature.
A, B=Material dependent constants.

The material dependent constant Wo in fact is also stress dependent. However, by taking temperature measurements when the device is both inactive and active, as discussed hereinafter, the effect of the stress is cancelled out. Material parameters other than Wo in this equation are to a first approximation also independent of stress. Therefore a stress term can be validly omitted from the above equation. Other relationships between phonon frequency and temperature are known and may be used.

Figure 3A:
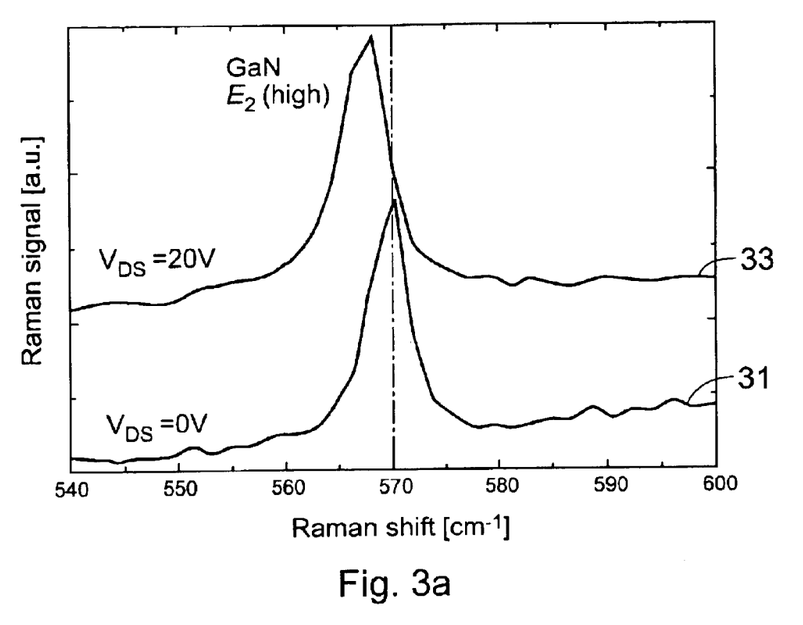
FIGS. 3a and 3b illustrate the measured phonon frequency of a semiconductor device.

FIG. 3a illustrates the typical output plot generated from a spectrometer in the arrangement as shown in FIGS. 1 and 2. The lower plot 31 is for a Gallium Nitride device with a drain-to-source voltage of 0V i.e. with the device inactive or turned off. It can be seen that there is a peak in the determined phonon frequency corresponding to a Raman shift of 569 $cm^{-1}$. The second plot 33 is for the same device with a drain-to-source voltage of 20V, i.e. with the device active or turned on. It can be seen that the peak of the Raman signal has shifted to a value less than 569 $cm^{-1}$. This indicates that the temperature of the device in the active state at the sampled location is different to the temperature when the device is inactive.

Figure 3B:
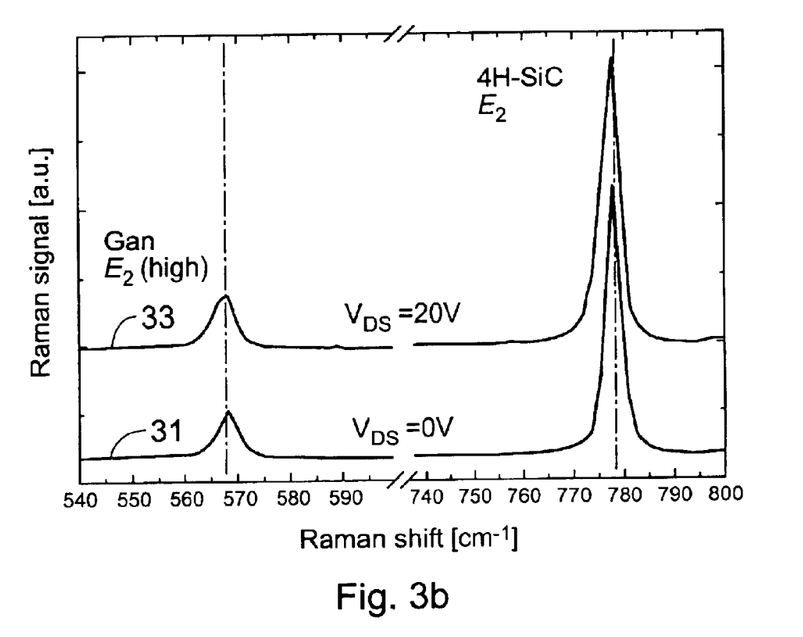

FIG. 3b shows the same plot lines 31 and 33 as shown in FIG. 3a, but with an extended horizontal axis, which shows a second peak in Raman signal intensity at a Raman shift value of approximately 780 $cm^{-1}$, shifted to below 780 $cm^{-1}$ when the device is active. This second peak corresponds to the characteristic phonon frequency of the Silicon Carbite (SiC) substrate of the semiconductor device 1. It can therefore be seen that the substrate temperature is different when the device is either on or off.

In conducting micro-Raman scattering measurements of HFETs of the type illustrated in FIG. 1, the present applicants have observed large asymmetries in the phonon frequencies measured across the source-drain gap, even at zero applied voltages. This is observed when the edges of the metal contacts are orientated perpendicular to the front edge of the microscope stage (denoted as the X direction in FIG. 1). The asymmetry reversed in sign when the device 1 is rotated by 180°, indicating that the frequency shifts are due to an artefact of the measurement process rather than an intrinsic property of the semiconductor material. It will be appreciated that should the spectrometer slit be arranged at 90° to that indicated in FIG. 1, the effect would be observed when the edges of the metal contacts are orientated parallel to the front edge of the microscope stage. It has been postulated by the present applicants that for measurements close to a metallic contact, part of the incident laser light 13 is blocked by the contact whilst the remainder is left to excite Raman scattering. The effect is not due solely to metal contacts but is also observed when the laser is incident close to, or on, any part of the device having a sharp, well defined edge. This asymmetry leads to an apparent shifting of the measured phonon frequency since only Raman scattered light from one side of the incident symmetric laser beam is detected. Given that, for the HFET devices of the type shown in FIG. 1, the source-gate gaps and gate-drain gaps are typically of the order of 3 μm or less it will be appreciated that measurements in close proximity to the metal contacts will often occur, thus giving rise to the observed shifts in phonon frequency that will lead to incorrect temperature measurements if not taken into account.

Figure 4:
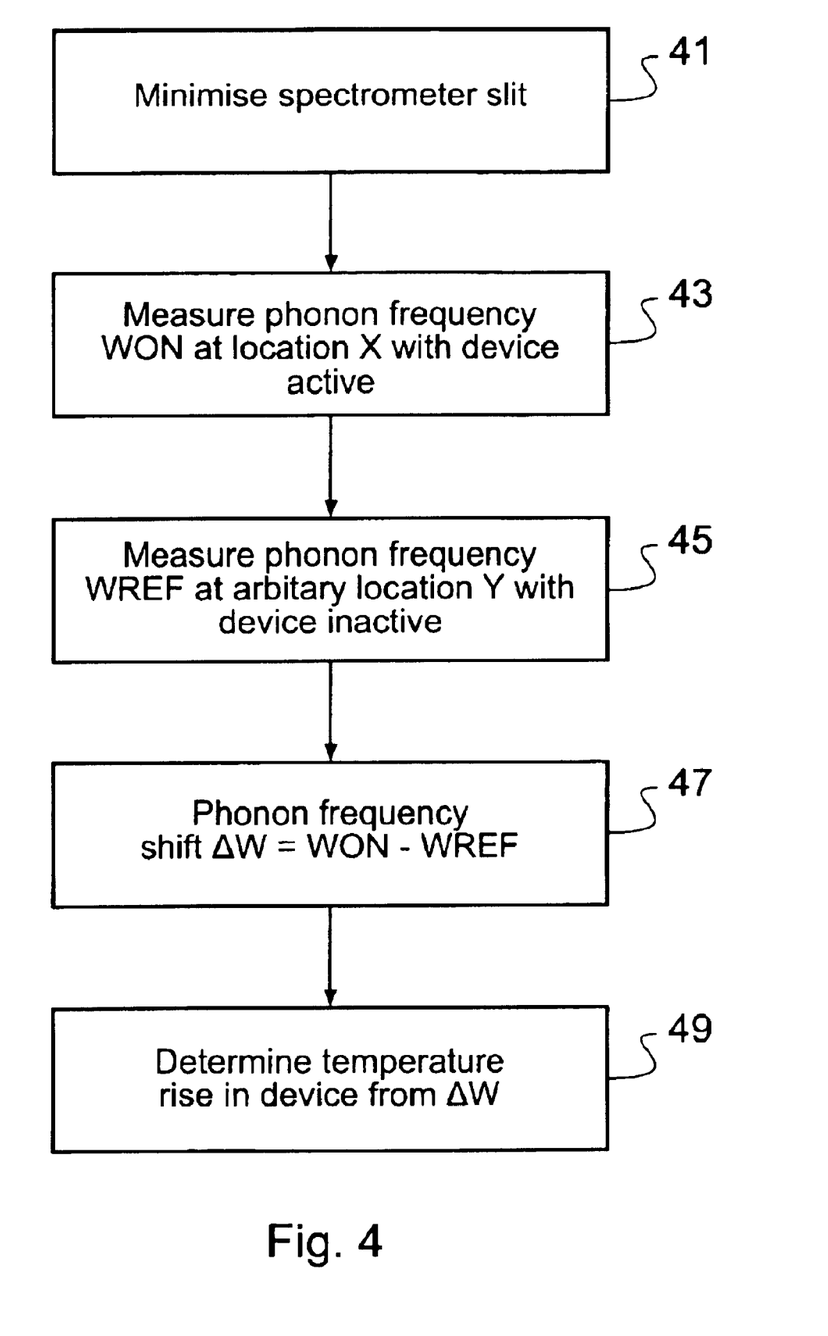
FIG. 4 is a flow chart illustrating the method of an embodiment of the present invention.

A solution according to an aspect of the present invention is to reduce the spectrometer slit width. This prevents light from outside the centre of the focus of the incident laser beam from reaching the spectrometer, at the expense of signal level. The slit width is the width of the slit 33 illustrated on FIG. 2. FIG. 4 illustrates a method of determining the temperature of a semiconductor device in accordance with this method of the present invention. The first step 41 is to minimise the spectrometer slit width, the effect of which is discussed in more detail with reference to FIG. 5. The next step 43 is to measure the phonon frequency $\omega_{ON}$ at the target location of interest with the semiconductor device being switched on, or active. The next step 45 is to measure the phonon frequency $\omega_{REF}$ at any arbitrary location y on the semiconductor device with the device inactive, or turned off. The second and third steps 43, 45 may be carried out in either order. At step four, 47 the shift in phonon frequency $\Delta\omega$ is calculated by subtracting $\omega_{REF}$ from $\omega_{ON}$. The determined temperature rise is then calculated at step five, 49 as function of the phonon frequency shift $\Delta\omega$.

Figure 5:
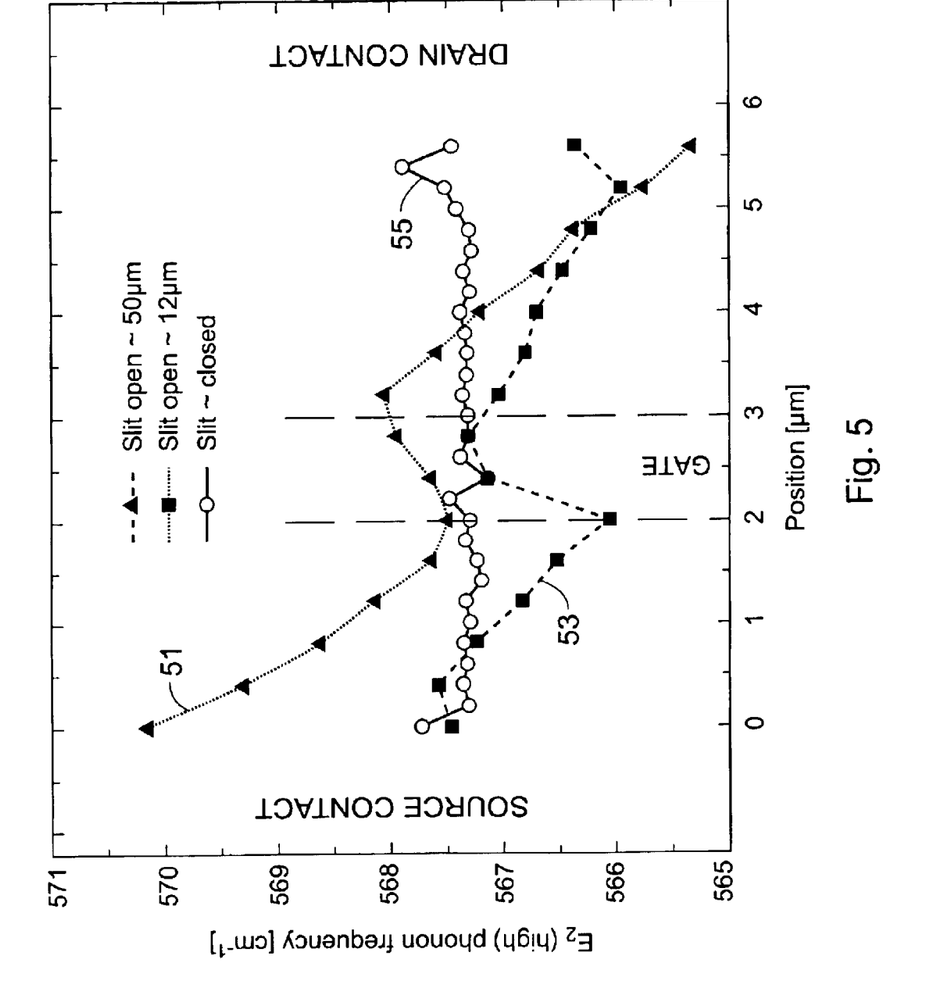
FIG. 5 graphically illustrates the measured phonon frequency of a device using different spectrometer slit widths.

The effect of reducing the slit width is illustrated with reference to FIG. 5. FIG. 5 is a plot of the measured phonon frequency at positions between the source contact 3 and drain contact 5 of the semiconductor device 1 illustrated in FIG. 1. Ideally, the phonon frequency should be constant across the source drain gap because the temperature across the source-drain is known to be uniform if the device is switched off. Three plots are illustrated in FIG. 5 corresponding to the measured results with the spectrometer slit open 51 at a approximately 50 μm, the slit being reduced to approximately 12 μm 53 and a plot 55 corresponding to the spectrometer slit being substantially closed. It can be seen that as the slit width is reduced the measured plot of phonon frequency with respect to position more closely approximates a straight line.

Figure 6:
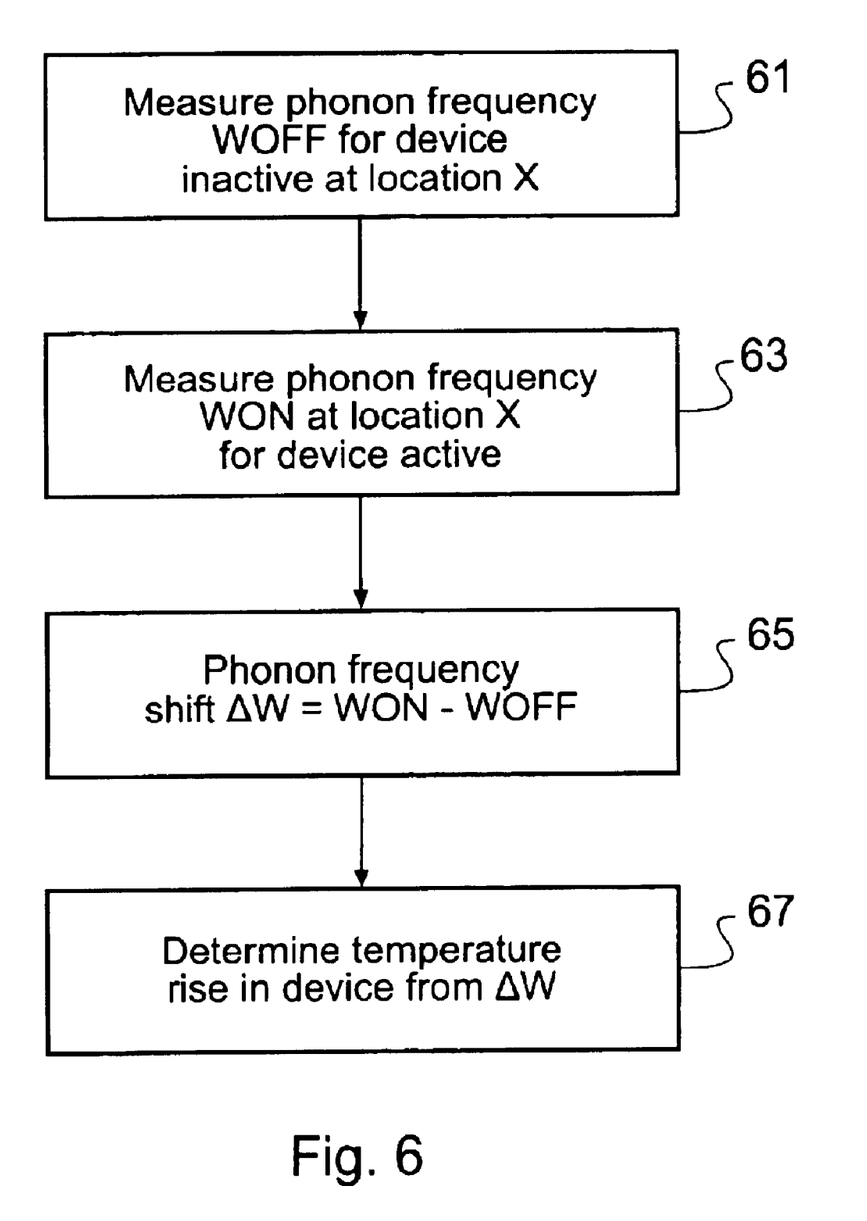
FIG. 6 is a flow chart illustrating the method of a further embodiment of the present invention.

FIG. 6 illustrates the method steps for an alternative method according to a further embodiment of the present invention. Step one 61 involves measuring the detected phonon frequency $\omega_{OFF}$ for the semiconductor device at a specific target location x when the device is inactive, or turned off. The second step 63 is to measure the phonon frequency $\omega_{ON}$ at the same target location x with the device turned on, or active. The first and second steps may be performed in either order. At step three 65 the phonon frequency shift $\Delta\omega$ is calculated by subtracting the phonon frequency $\omega_{OFF}$ for the device when it is turned off from the phonon frequency $\omega_{ON}$ at the same location when the device was turned on. Following this at step four 67 the temperature rise of the device due to it being active is calculated as a function of the frequency shift $\Delta\omega$. By taking measurements of the phonon frequency at the same target location for the device being both turned on and turned off the additional phonon frequency shift caused by the close proximity of the metal contact is taken into account and eliminated as it has the same effect regardless of the operating state of the device.

Figure 7:
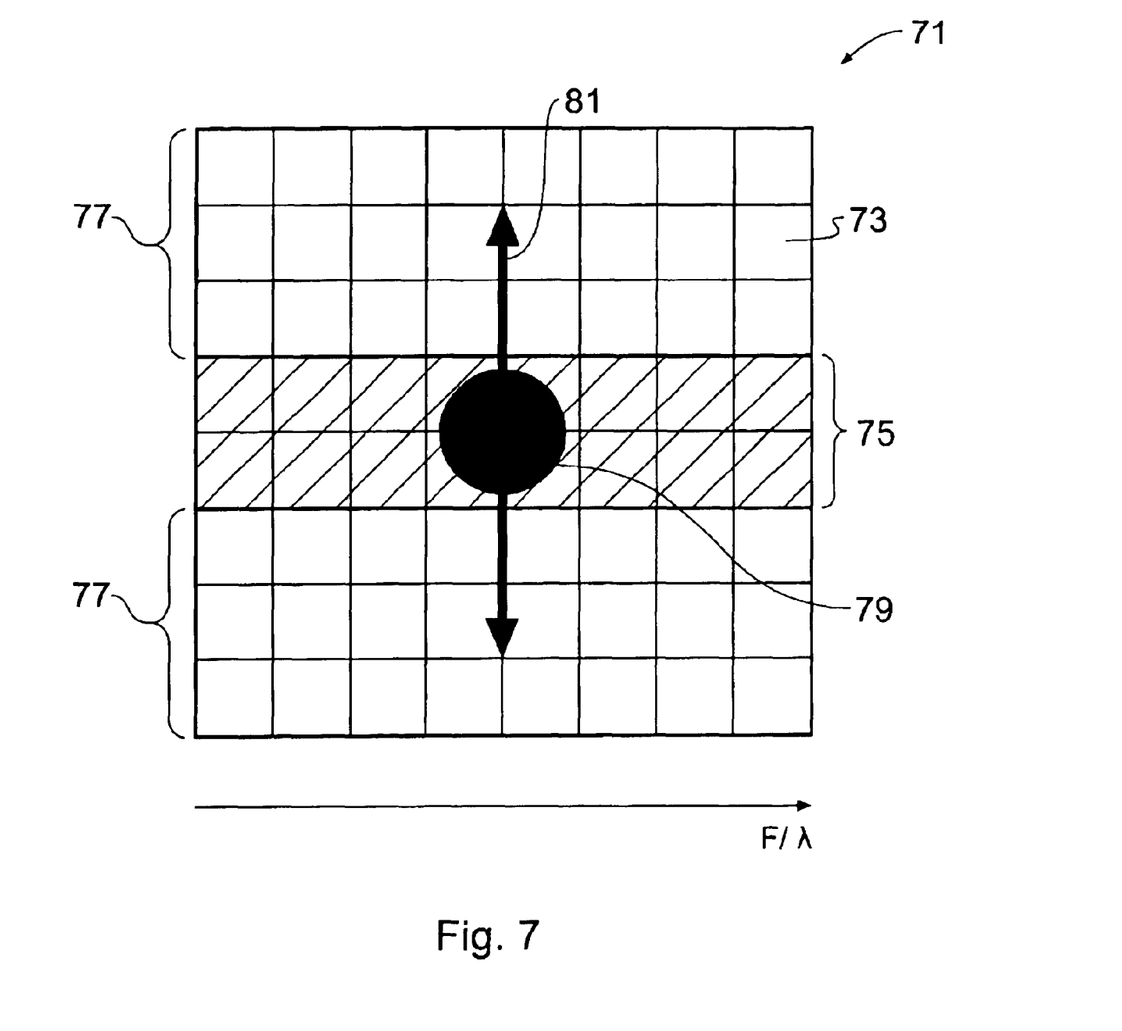
FIG. 7 schematically illustrates the effect of reducing the binning width a of CCD.

It has been observed by the applicants that the frequency shifting effect produced by the close proximity of the metal contacts is most strongly seen when the edges of the contacts are orientated perpendicular to the x direction as indicated in FIG. 1. If the contacts are orientated such that they are substantially parallel to the x direction the effect of the contacts is to displace the detected signals on the CCD array of the spectrometer perpendicular to the frequency axis. Therefore a loss of spatial resolution is the side effect rather than the frequency shifting problem. To overcome this, the CCD pixel binning width can be reduced. This is illustrated and explained with reference to FIG. 7. The CCD array 71 is illustrated as a grid made up of individual pixels 73. The binning width refers to the number of pixels of a subset 75 over this total number of pixels 73 that are used to provide the measurement signals. Signals from the remaining pixels 77 are disregarded. The laser spot 79 represents the area of the CCD array impinged on by the collected laser light when the effect of the contacts has no effect. As the target location is brought nearer a contact, the effect is to disperse the laser spot 79 in the direction indicated by the arrow 81. By reducing the width of the strip 75 of pixels used for the measurement signals the above effect can be reduced. Binning width control is a feature provided on most spectrometers.

As the orientation of metal contacts on an electronic device with respect to the later scanning stage may not always be known, or may vary across a scanned line, an approach according to an embodiment of the present invention is to both minimise the slit width of the spectrometer and to also control the binning width.

It is preferred, although not essential, that the wavelength of the laser used is below the bandgap of the semiconductor materials present within the semiconductor device 1. The use of a laser wavelength below the bandgap of the semiconductor materials results in no, or minimal, laser absorption within the semiconductor materials during the temperature measurements. This therefore minimises the effect of the temperature measurement technique on the semiconductor device electrical characteristics. However, the use of laser wavelengths below the bandgap of the semiconductor materials introduces its own problems with regards to depth resolution of the laser. The problem is that as the semiconductor material is effectively transparent to the selected laser wavelength it becomes more difficult to control the depth within the semiconductor device at which the laser light is focused. It will be appreciated that it may well be desirable to focus the laser light at variable depths within the device so as to focus on different layered structures within the device. One solution used in accordance with embodiments of the present invention is to make use of confocal microscopy. Confocal imaging in a confocal microscope is usually achieved by placing a small aperture in front of a photo detector. This has the effect that essentially only the part of the semiconductor material in the focal plane of the laser focussing lens 11 is imaged on the CCD array of the spectrometer. Light collected from outside the focal plane of the lens 11 is rejected by the small aperture.

Therefore the focussing lens 11 can be positioned at a suitable distance above the semiconducted device 1 so as to focus at the desired depth within the semiconductor material. Alternatively or additionally, the fact that the different semiconductor materials within the device 1 have characteristic phonon frequencies can be utilised to adjust the spectrometer such that it detects only the phonons of the desired frequency. This latter method does require a full knowledge of the construction of the semiconductor device so as to know at what depth any given semiconductor material occurs.

If the use of laser wavelength below the bandgap of the semiconductor material is not possible, use may be made of lasers having an above bandgap wavelength if they are used with low power, so as to avoid undue excitation of the semiconductor materials. The disadvantage of this technique is that, with the exception of silicon, the Raman scattering efficiency of other commonly used semiconductor materials is particularly low, making detection of the phonon frequency difficult.

The method of detection as set forward in FIG. 4 can also be used to determine stress near the metal contacts within the semiconductor device 1. This is possible because the phonon frequency also has a functional relationship with the stress within the semiconductor material. Hence the stress induced in the semiconductor device 1 due to the device fabrication can be determined. The relationship is given by the equation:

$$\Delta\omega = K\sigma$$

where K is a material dependent constant and σ is stress.

Furthermore, in some embodiments of the present invention it may be more preferable to determine areas of higher temperature within the active semiconductor device 1 utilising the known techniques of infra-red thermography. Having used detection of infra-red radiation from the active semiconductor device to determine areas of increased temperature, the micro-Raman scattering methods described in embodiments of the present invention hereinabove may then be utilised to examine those particular areas of interest.

What is claimed is:

1. A method of measuring the temperature of an electronic device, the method comprising;

irradiating a target location on the electronic device, the target location being proximate to a metal contact, using the laser with the device being inactive, such that a portion of the laser light irradiating the target location is incident on and scattered by the metal contact, and determining a first phonon frequency of the device at the target location;

irradiating the target location using the laser with the electronic device being active and determining a second phonon frequency at the target location;

determining the difference between the first and second phonon frequency; and determining the temperature of the active electronic device at the target location as a function of the determined phonon frequency difference.

2. A method according to claim 1, wherein the spectrometer comprises a charge coupled device and the binning width of the spectrometer is reduced so as to minimise a loss in spatial resolution.

3. A method according to claim 1, wherein the electronic device comprises a plurality of portions, each portion having a predetermined bandgap.

4. A method according to claim 3, wherein the wavelength of the laser is selected such that it is less than the bandgap of at least one of the portions.

5. A method according to claim 4, wherein the laser is focused on a selected portion using confocal microscopy.

6. A method according to claim 1, further comprising the step of positioning the spectrometer to detect phonons having a frequency substantially equal to a desired frequency, wherein the desired frequency is a characteristic of the material structure of the selected portion.

7. A method of measuring the temperature of an electronic device utilising a spectrometer having a slit through which scattered laser light is collected, the method including;

minimising the width of the spectrometer slit;

irradiating an arbitrary location on an electronic device using a laser with the device being inactive, determining the phonon frequency of the device at the arbitrary location using the spectrometer and storing the determined phonon frequency;

irradiating a target location on the electronic device, the target location being proximate to a metal contact, using the laser with the device being active, such that a portion of the laser light directed at the target location is incident on and scattered by the metal contact, and determining the further phonon frequency of the device at the target location with the spectrometer;

determining the difference between the stored phonon frequency and further phonon frequency; and determining the temperature of the active device at the target location as a function of the determined phonon frequency difference.

8. A method according to claim 7, wherein a plurality of target locations are irradiated with the electronic device being active and the difference determined between the stored phonon frequency and the phonon frequency at each of the plurality of target locations.

9. A method according to claim 7, wherein the spectrometer comprises a charge coupled device and the binning width of the spectrometer is reduced so as to minimise a loss in spatial resolution.

10. A method according to claim 7, wherein the electronic device comprises a plurality of portions, each portion having a predetermined bandgap.

11. A method according to claim 10, wherein the wavelength of the laser is selected such that it is less than the bandgap of at least one of the portions.

12. A method according to claim 11, wherein the laser is focused on a selected portion using confocal microscopy.

13. A method according to claim 11, further comprising the step of positioning the spectrometer to detect phonons having a frequency substantially equal to a desired frequency, wherein the desired frequency is a characteristic of the material structure of the selected portion.

14. A method of measuring the temperature of an electronic device, the method comprising;

irradiating a target location on the electronic device using a laser with the device being inactive and determining a first phonon frequency of the device at the target location;

irradiating the target location using the laser with the electronic device being active and determining a second phonon frequency at the target location;

determining the difference between the first and second phonon frequency; and determining the temperature of the active electronic device at the target location as a function of the determined phonon frequency difference; wherein the target location is selected by detecting areas on the electronic device of comparatively high temperature by measuring infra-red radiation emitted by the device.

15. A method of measuring the temperature of an electronic device utilising a spectrometer having a slit through which scattered laser light is collected, the method including;

minimising the width of the spectrometer slit;

irradiating an arbitrary location on an electronic device using a laser with the device being inactive, determining the phonon frequency of the device at the arbitrary location using the spectrometer and storing the determined phonon frequency;

irradiating a target location on the electronic device using the laser with the device being active and determining the further phonon frequency of the device at the target location with the spectrometer;

determining the difference between the stored phonon frequency and further phonon frequency; and determining the temperature of the active device at the target location as a function of the determined phonon frequency difference; wherein the target location is selected by detecting areas on the electronic device of comparatively high temperature by measuring infra-red radiation emitted by the device.

* * * * *